Figure 1:
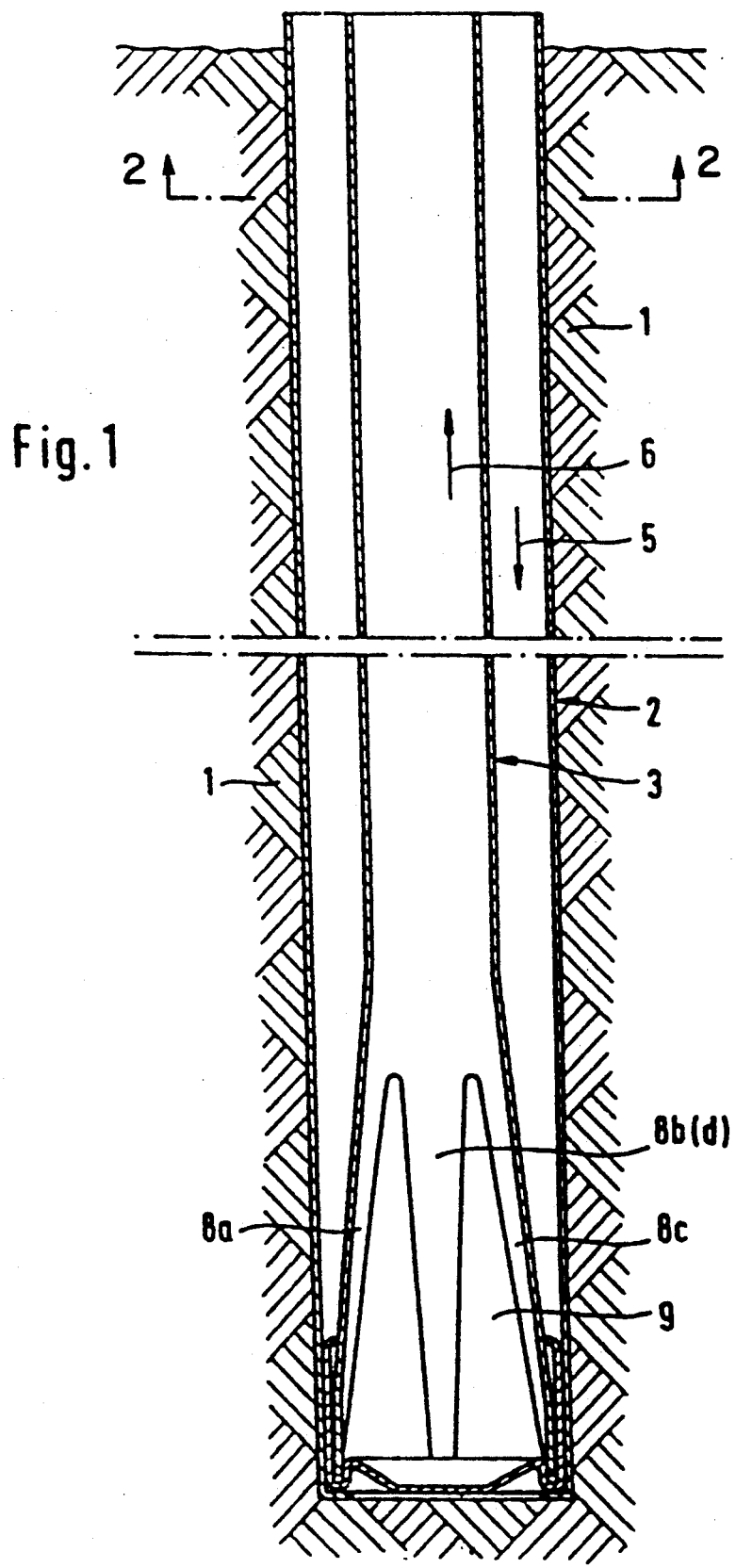

United States Patent [19]

Horton

[11] Patent Number: 5,203,173
[45] Date of Patent: Apr. 20, 1993

[54] DEVICE FOR UTILIZATION OF GEOTHERMAL ENERGY

[76] Inventor: Diego Horton, Tobas 196, C.P. 5153 Costa Azul, Villa Carlos Paz, Argentina

[21] Appl. No.: 809,518
[22] PCT Filed: May 16, 1991
[86] PCT No.: PCT/DE91/00406
  § 371 Date: Jan. 21, 1992
  § 102(e) Date: Jan. 21, 1992
[87] PCT Pub. No.: WO91/18205
  PCT Pub. Date: Nov. 28, 1991

[30] Foreign Application Priority Data

May 18, 1990 [AR] Argentina ............................... 316883
May 18, 1990 [JP] Japan ................................... 316884
Sep. 26, 1990 [JP] Japan ................................... 317951

[51] Int. Cl.5 ............................................. F03G 07/04
[52] U.S. Cl. ..................................... 60/641.2; 165/45
[58] Field of Search ................. 60/641.2, 641.3, 641.4, 60/641.5; 165/45

[56] References Cited

U.S. PATENT DOCUMENTS 4,364,232 12/1982 Sheinbaum .
4,512,156 4/1985 Nagase .
4,912,941 4/1990 Buchi .

FOREIGN PATENT DOCUMENTS 0017783 10/1980 European Pat. Off. .
0045993 2/1982 European Pat. Off. .
0118788 11/1988 European Pat. Off. .
2358019 5/1975 Fed. Rep. of Germany .
2458457 7/1975 Fed. Rep. of Germany .
2405595 8/1975 Fed. Rep. of Germany .
2538344 5/1976 Fed. Rep. of Germany .
2715499 10/1977 Fed. Rep. of Germany .
2749502 5/1978 Fed. Rep. of Germany .
2904140 8/1980 Fed. Rep. of Germany .
2907338 9/1980 Fed. Rep. of Germany .
2918001 11/1980 Fed. Rep. of Germany .
2927222 1/1981 Fed. Rep. of Germany .
3015307 10/1981 Fed. Rep. of Germany .
3029753 2/1982 Fed. Rep. of Germany .
3433057 3/1986 Fed. Rep. of Germany .
2323897 4/1977 France .
56-38577 4/1981 Japan .

OTHER PUBLICATIONS

Alfred Buch, *Energie*, vol. 28, No. 10, pp. 278-280; Oct. 1976.

Primary Examiner—Allen M. Ostrager
Attorney, Agent, or Firm—Merchant, Gould, Smith, Edell, Welter & Schmidt

[57] ABSTRACT

The device proposed has a pipe (3) sunk into the Earth's crust and designed to convey to the surface a fluid heated by geothermal energy, possibly in vapor form. The device also has a second, outer, pipe (2) surrounding the conveyor pipe and designed to carry the fluid back into the Earth, as well as an end cap (4) which forms a pressure-tight closure over the end of the outer pipe to prevent the ingress of the surrounding rock, etc., the conveyor pipe being joined to the outer pipe at the bottom, in the region of the closure.

13 Claims, 2 Drawing Sheets

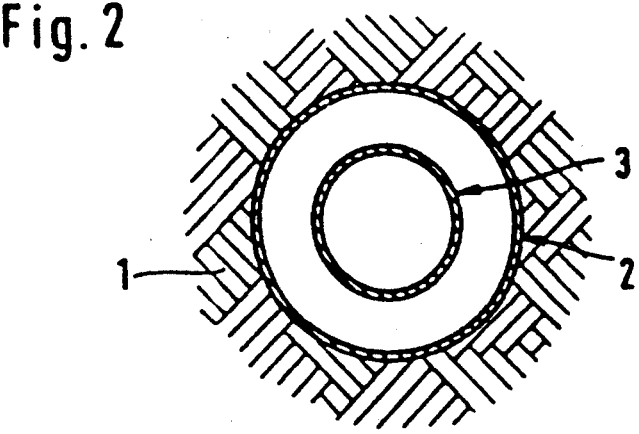
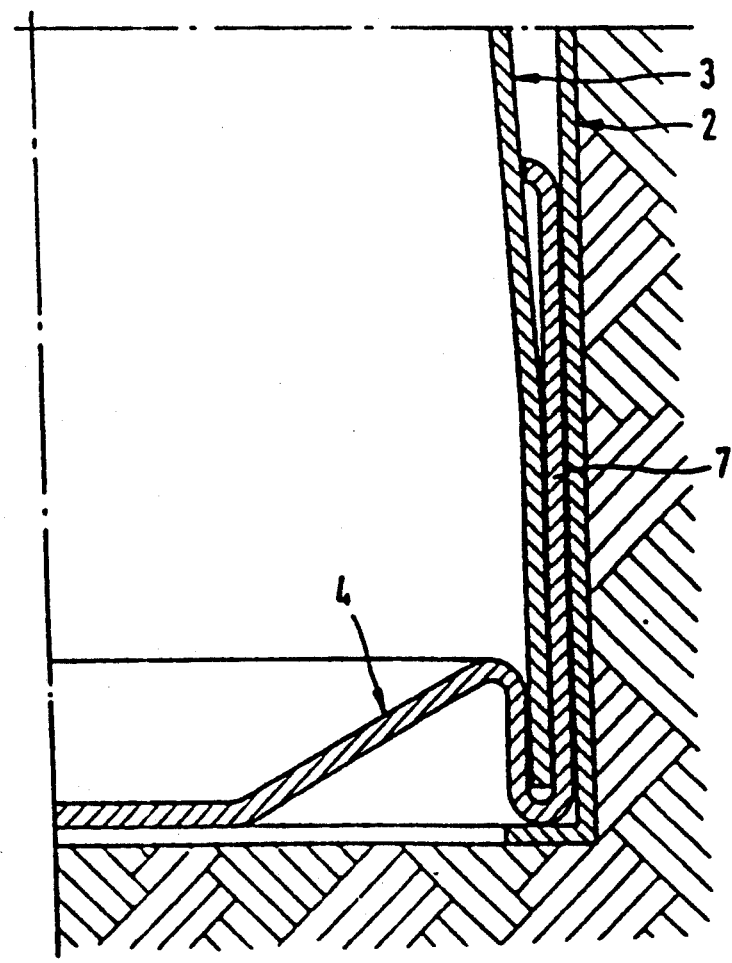

DEVICE FOR UTILIZATION OF GEOTHERMAL ENERGY

The invention concerns a device for utilization of geothermal energy, wherein a conveyor tube is sunk into the earth's crust for the purpose of raising a medium located therein that is heated by geothermal energy, and possibly transported in vapor form.

Devices for utilization of geothermal energy have been known for a long time. However, they frequently work with systems that are not closed, wherein a fluid is pumped into hot rock and, partially at other places, is again transported to the surface after heating. Here, the fluid pressure arising by heating, in the example with water for example also the water-vapor pressure, is frequently used for forcing upward. For example, a process of this type is known from DE-OS 29 04 140, in which a working fluid consisting of water and of a ketone is introduced into a filler shaft and, after it has passed a geothermal storage formation, is again recovered in a delivery shaft and converted to vapor (steam). A process of this type, in particular when further mixed with a ketone, has the strong disadvantage that only part of the working fluid introduced will be recovered again, and that, because of the open circuit, impurities can possibly be carried into the recovered working fluid. This is highly undesirable, in particular in the case of use of turbines that are to convert the vapor energy into electrical energy. The impurities would lead to deposits and abrasions.

Another disadvantage of such open systems is that the potential energy that must be applied for bringing up the vapor is not correspondingly utilized also when bringing down the working fluid. This type of utilization of the potential energy, which, in particular, appears in the form of a very high fluid pressure at the lower end of a fluid column, is used by way of example in DE-OS 29 07 338 in which a so-called deep-shaft-drop power system is described. However, that installation is highly complicated, includes an internal combustion engine, and does not take into account that heating of the working fluid is already possible by means of geothermal energy (even though in lesser measure). Hence, even with knowledge of the device proposed there, it is not possible to use geothermal energy in a simple manner together with the potential energy that is released with ascent of the medium. In particular, in the case of an installation of this type, it has been demonstrated that raising the temperature of water to 150° C. at a given depth of the shaft does not suffice for generating a vapor (steam), since there prevails a pressure such that conveyed fluid medium does not become vapor-forming at this temperature.

Therefore, the attempt has been made to use fluids other than water. In so doing, proposed, for example in DE-OS 28 18 001, has been Frigen 22 (monochlorodifluoromethane) having a boiling point of about $-41°$ C., which would vaporize already with the heating taking place at lower depths. A working fluid of this type, which can not be used in large plants because of its lacking compatibility with the environment, could find application based on the reverse principle of the cooling chamber. However, also described with this is essentially only a customary type heat exchanger. The special problems and possibilities that occur by using geothermal energy at greater depths, namely raising the pressure in a column of liquid in comparison to the pressure at the surface of the earth and the considerable temperature at greater depths of the earth's crust, are neither resolved by the system nor have they been recognized at all.

Also working based on the same principle is the process described in DE-OS 30 15 307 for converting heat into mechanical energy. It is only that propane, among others, has been proposed as a medium, which in the case of large installations harbors within itself safety risks.

Still to be mentioned also is DE-OS 34 33 057, in which a process and an arrangement for recovering electrical or mechanical energy from hot geothermal beds based on a Rankine process is described. However, the continuous process described there for a bed, which corresponds to the Carnot continuous process for ideal gases, presupposes a complicated and disturbance-prone, respectively maintenance-expensive contrivance, because the bed is first relaxed and the vapor arising out from the bed is next condensed, and its heat of condensation is transferred to the working medium in the secondary circuit for its film evaporation, following a multistage heating of the fluid working medium up to its vaporization point.

The process described there does not take into account that water under high pressures boils later, and that for reaching the critical temperature, i.e. the temperature at which water boils independently of the pressure (374° C.), very deep drilling in the earth would be required. This type of deep drilling is not possible, since the breaking length of the steel, i.e. the length of a steel tube that can be suspended on itself before the steel breaks from its own weight, is shorter. Therefore, a thusly described process can be used only at special points in the vicinity of volcanic activity of the earth's crust or the like.

Additionally to be mentioned are DE-OS 25 38 344 and DE-OS 27 49 502 along with DE-PS 27 15 499, each of which describe in more detail the heat pump principle in various forms of embodiment, however do not make use of the potential energy of the downwardly-flowing fluid.

Finally, still to be mentioned is European Patent 0 118 788 B1, in which is described a process for utilization of geothermal energy, in which the fluid trickles down in a vapor-conveying tube in a film like layer, and is vaporized by the action of the geothermal energy, whereupon established in the vapor-conveying tube is an over pressure exceeding the atmospheric pressure, whereby will be further required that the fluid in the vapor-conveying tube display a specific heat of vaporization of at least 1000 kJ/m$^3$ of saturated vapor. A contrivance of this type, through the downward trickling of the liquid on the inner wall of the tube, can not prevent vapor from depositing itself on the cold portion of the downwardly-trickling fluid located in the upper part of the tube, and can not make use of the high pressures in the fluid occurring because of the high column of liquid. Therefore, it must remain suboptimal.

Therefore, the object of this invention is to render geothermal energy usable with little engineering expense, in particular here to utilize the potential energy of downwardly-flowing medium, and to achieve this with means that are not dangerous for the environment and with little maintenance expense.

This objective is satisfied in accordance with the invention by the fact that a second, outer tube that surrounds the conveyor tube is provided for supplying the medium to the bottom, and a closure piece that closes off the outer tube in pressure-tight fashion against the surrounding rock or the like, with the conveyor tube being connected, at its lower closure region, with the outer tube.

Through a device of this type, it is possible to introduce the medium into the external tube at the surface, in order, then, to be conveyed downwardly, probably in a liquid column, to the lowest point, namely the point where the external tube is connected with the conveyor tube. In so doing, and in particular at the lower end point, the medium will heat to the extent that it probably even passes over into the vapor form. The heated medium or the vapor is then conveyed onward to the surface through the inner conveyor tube. The considerable vapor pressure arising thereby can be used at the surface for generating electrical energy, or, in the event that one chooses a lesser tube length and no vapor occurs, rather only heated medium rising because of its lesser specific weight, this warmed medium capable of being used as a heating medium, or being used in a heat exchanger.

Further proposed is to provide the conveyor tube with a heat insulator, in particular a jacket made of a synthetic insulating material placed on the inside of the conveyor tube. A jacket of this type around the inner conveyor tube has the advantage of avoiding an exchange of heat between the inner tube with the very hot medium and the outer tube in which the medium is conveyed down. This is important because, in particular in the top part of the device, the heating medium located inside the conveyor tube should not be cooled down to much. The medium located in the external tube should be heated exclusively by the geothermal energy of the surrounding rock formations. A construction of this type has the advantage of guaranteeing that the inner conveyor tube can be placed inside the outer tube without problem and that the end regions will assume the desired position relative to one another.

Relative to dimensioning the device, proposed is that the outer tube have a typical diameter of 30 cm, and that the conveyor tube have a typical diameter of 15 cm. This selection of dimensions has the advantage that sinking into the ground can be done with holes corresponding to customary type drilling equipment. Also, the dimensions of the tubes should not be too large, since otherwise, because of the great amount of medium flowing within them, a notable cooling of the rock will be provoked, which, because of the low heat conduction of the rock, can not be easily compensated. The thusly selected dimensions make it possible, within an area to which is a associated a single system at the surface of the ground, for example a turbine, to produce several borings in the rock. For example, it would be possible to produce four holes over an area of 100 m × 100 m in a square arrangement.

Further proposed is that the conveyor tube be supported, in the lower closure region of the outer tube, against this latter or against a part closing off this tube. It is naturally conceivable only to suspend the conveyor tube in the inner tube, but a construction of this type has the advantage of being able in this way to achieve a simple but reliable joining of the closure regions.

Further proposed is that the conveyor tube display, in its lower closure region, openings that produce a connection between the conveyor tube and the outer tube A construction of this type has the advantage of being able to hold the connecting surfaces between the outer and the inner tube small, so that only a controlled, small portion of the medium can enter the inner tube. The exact amount that should enter in this way is dependent upon the temperature conditions as well as upon the other magnitudes determining the dimensions of the installation.

Alternatively to this, capable of being provided in the lower end section of the conveyor tube are separator plates that display valves for passage of the heated and possibly-vaporized medium, whereby likewise possible is a control of the medium being passed on to the conveyor tube. Provided for doing this are, for example, 4 to 6 mill valves per separator plate.

Further proposed is that the closure piece be provided at its outer circumference with a perpendicular rim, through which is produced the connection of the conveyor tube with the outer tube and the closure piece, for the purpose of supporting the lower end of the conveyor tube, with the conveyor tube being divided in its lower end section into four end sections, which among them enclose a larger cross sectional area than the cross sectional area in the rest of the conveyor tube, with the end zones of these end sections resting in at least one depression in the closure piece, which is formed between the perpendicular rim and one raised region of the closure piece formed toward the rim, near the middle of the connector piece.

The invention preferably proposes to use as a medium carbontetrachloride ($CCl_4$), and the conveyor tube to be sunk down to the point where the $CCl_4$ vaporizes essentially completely in the region of the connection between conveyor tube and outer tube. With this, one has a medium having a high specific weight, which causes a high potential energy that can be utilized, which further has a low critical temperature, therefore has a lower temperature at which it vaporizes independently of the ambient pressure. The critical temperature of $CCl_4$ amounts to 283° C., therefore lies at almost 100° C. less than in the case of water. The specific weight lies at 1.6, is, therefore, raised by 60% relative to water. The boiling heat amounts to 45 cal/kg, while that of water is 539 cal/kg. The boiling temperature lies at 76.7° C. Also, $CCl_4$ is noncombustible, hence there existing no danger of an explosion and/or spontaneous combustion, as would be entirely possible in the case of some other proposed fluids.

Proposed here is to provide, at the upper end of the conveyor tube, a turbine station for utilization of the pressure energy of the vapor.

Alternatively proposed is to use water as the medium in areas suited therefor, and/or in the event a hot water supply is desired. Water has the advantage of easy availability, and offers the possibility to work, possibly in an open circuit, without returning the already once-conveyed medium.

Preferred for doing this is to provide a removal station for removal of the heated water and for bringing the water into a warm water reservoir. In this case, continuous water would naturally have to be delivered.

Alternatively proposed is to provide a heat exchanger at the upper end of the conveyor tube, which makes use of the heat energy contained in the heated, and possibly vaporized, medium. A heat exchanger of this kind can be arranged just as well ahead of a turbine station as after or ahead of a removal station for removing the medium. Preferred, however, is placement after a turbine.

Other features and advantages of the invention are obtained from the following description and the accompanying drawings.

FIG. 1 shows a preferred form of embodiment of the overall device below the surface of the earth, FIG. 2 shows a cross sectional representation of the device in accordance with the invention; and FIG. 3 shows a cut-out representation of the lower closure region of the device in accordance with the invention.

In FIG. 1, the device is shown in the surrounding earth's crust 1, with an outer tube 2, a vapor-conveying tube 3, a closure piece 4 and the end sections 8a, 8b, 8c, which are located in the lower closure region of the conveyor tube in order to support this latter. Downwardly-flowing, fluid medium is designated by the reference number 5, and rising, possibly vaporized, medium by the reference number 6.

The downwardly flowing medium in the space defined by tubes 2 and 3 communicates with the vapor conveying tube 3 through holes 9 at the lower region of the conveyor tube.

Shown in FIG. 2 is a cross section of the device along the line A—A of FIG. 1. Clearly to be recognized are the size relationship of the conveyor tube 3 relative to the outer tube 2 that are being proposed.

Finally, represented in FIG. 3, in a representation cut out from FIG. 1, is the construction of the lower closure section of the device in accordance with the invention. The closure piece 4 has a perpendicular rim 7 that is located between the end sections 8a to 8d of the conveyor tube 3 and the outer tube 2. Furthermore, constructed in the closure piece 4, adjacent to the perpendicular rim, toward the middle of the closure piece 4, is a raised region of the closure piece. This construction considerably simplifies bringing and holding correctly in place and position the inner conveyor tube 3 that is emplaced later.

Sealing of the outer tube 2 is promoted by the special construction wherein the conveyor tube 3 is pressed onto the closure piece 4 at the bottom. In this manner, the entire weight of the inner conveyor tube 3 is additionally used to press the closure piece 4 firmly into the bore hole, respectively into the outer tube 2. In doing this, a "flange" on the closure piece 4 can be used, which is pressed against the outer tube 2.

Enabled by the device in the drawing is to heat the medium up to a critical temperature. At the critical temperature, vapor and fluid exist more closely to one another, so that no heat of vaporization needs to be expended any longer. Above the critical temperature, the proposed medium has about half the specific weight of that of the cold fluid medium, so that there results from the difference between the weights of the columns of fluid in the conveyor tube and the outer tube 2 a pressure that permits the medium 6 that is in the conveyor tube 3 to rise, so that electrical energy can be recovered with a turbine from this medium 6 that is under pressure.

Introduction of the medium 5 into the outer tube occurs at a speed of about 70 m/sec., from which results a vapor discharge speed corresponding to about 200 m/sec.

When using $CCl_4$, one can, if one starts out from a geothermal gradient of 25 m/° C., with a boring depth of 7000 m, reach the critical temperature even in normal earth crusts. A boring depth of this kind is realistically achievable. Because of the high specific weight, a large difference is obtained between the weight of the column of fluid and the vapor column per $cm^2$, so that the pressure supplying power to a generator via the turbine is increased.

It is further advantageous that the boiling heat in the case of $CCl_4$, which is released by positive condensation, be small, so that this lost waste heat, if it is not used for heating purposes, be likewise small.

Also, the temperature of 76.7° C. for $CCl_4$ is advantageous because it permits using a heat exchanger with water, which assures condensation of the working agent, which is conveyed at atmospheric pressure in a reservoir for re-use.

Furthermore, $CCl_4$ is advantageous since it does not convey the corrosion, and it is also noncombustible.

With an appropriate layout of the installation, it is possible to achieve vapor pressures in a magnitude of about 300 atu at the earth's surface (at about 520 atm at a 7000 m depth), which, in any case, suffice for turbines. Water, which is used in the cooling system for the $CCl_4$, leaves this latter at a temperature of about 70° C. and can, therefore, be used for heating purposes in residential areas or the like if the device is constructed in a city. Also reduced by these means are power losses, as compared to other contrivances generating heat or current from fuels, respectively other known, fixed energy generating installations that generate energy from wind or water.

In comparison to known energy-supplying installations, this proposed device is extremely environment-friendly, since it employs no fossil fuels, releases no additional $CO_2$ into the atmosphere, and requires only a small area.

To be described in the following, as an example for utilization of water, is one example of embodiment. Here, preferably produced is a hole in the ground 30 cm in diameter to a depth of about 4000 m, and additionally used as the outer tube 2 is a 12-inch tube for supporting the sides of the boring, as is already customary in the case of oil borings. A conveyor tube 3 about 6 inches (in diameter) is provided on the inside with heat isolating (insulating) material.

The features of the invention disclosed in the foregoing description as well as in the claims and drawings can be essential individually, and also in any random combination for realizing the invention in its various forms of embodiment.

I claim:

1. A device for utilization of geothermal energy, wherein a conveyor tube is sunk into the earth's crust for the purpose of raising a medium located therein that is heated by geothermal energy, and possibly transported in vapor form; said device being characterized by:

(a) a second, outer tube (2), which surrounds the conveyor tube (3), for conveying the medium to the bottom, and a closure piece (4) that closes off the outer tube in pressure-tight fashion against the surrounding rock or the like;

(i) the conveyor tube (3) being connected at a lower closure region thereof, with the outer tube (3);

(ii) the closure piece (4) being provided at its outer circumference with a perpendicular rim (7), through which is produced the connection of the conveyor tube (3) with the outer tube (2) and the closure piece (4) for supporting the lower end of the conveyor tube (3), with the conveyor tube (3) being divided, in its lower closure region, into at least four sections (8a, 8b, 8c and 8d), which among them enclose a greater cross sectional area than the cross sectional area in the rest of the conveyor tube (3), with end zones of these end sections (8a, 8b, 8c, 8d) resting in at least one depression in the closure piece (4), which is constructed between the perpendicular rim (7) and one of the raised regions of the closure piece (4) formed toward the rim, adjacent to a middle of the closure piece (4).

2. A device according to claim 1 characterized in that the conveyor tube (3) is supported in the lower region of the outer tube (2) against same.

3. A device according to claim 1 characterized in that the conveyor tube (3) is supported in the lower region of the outer tube (2) against a part closing off the outer tube.

4. Device according to claim 1, characterized in that the conveyor tube (3) is provided with a heat insulation.

5. Device according to claim 4, characterized in that the heat insulation comprises a jacket made of a synthetic insulating material placed on the inside of the conveyor tube (3).

6. Device according to claim 5, characterized in that the outer tube (2) has a diameter of about 30 cm and the conveyor tube (3) a diameter of about 15 cm.

7. Device according to claim 1, characterized in that the conveyor tube (3) displays, in its lower closure region, holes (9) that produce a connection between conveyor tube (3) and outer tube (2).

8. Device according to claim 1, characterized in that there are provided in the lower end section of the conveyor tube (3) separator plates toward the outer tube (2), which display valves for passage of the heated and possibly vaporized medium.

9. Device according to claim 1, characterized in that the medium is carbon tetrachloride ($CCl_4$), and that the conveyor tube (3) is sunk down to the point where $CCl_4$ is essentially completely vaporized in the connecting region between conveyor tube (3) and outer tube (2).

10. Device according to claim 9, characterized by a turbine station for utilizing the pressure energy of the vapor (steam) at the upper end of the conveyor tube (3).

11. Device according to claim 1, characterized in that the medium is water.

12. Device according to claim 11 for removal of the heated water and for bringing the heated water into a warm water reservoir at the upper end of the conveyor tube (3).

13. Device according to claim 12, characterized in that provided at the top end of the conveyor (3) is a heat exchanger that makes use of the heat energy contained in the medium.

* * * * *